United States Patent [19]

Intengan

[11] Patent Number: 4,673,143
[45] Date of Patent: Jun. 16, 1987

[54] HAND-HELD FISHING REEL

[76] Inventor: Franklin S. Intengan, 17831 SW. 79th Pl., Palm Springs North, Fla. 33015

[21] Appl. No.: 822,382

[22] Filed: Jan. 27, 1986

Related U.S. Application Data

[63] Continuation-in-part of Ser. No. 673,582, Nov. 21, 1984, abandoned.

[51] Int. Cl.$^4$ .................. B65H 75/40; A01K 89/015
[52] U.S. Cl. ............................. 242/96; 242/84.51 P
[58] Field of Search ........... 242/129.7, 129.71, 129.72, 242/136, 141, 96, 99, 84.2 J, 84.1 R, 84.51 R

[56] References Cited

U.S. PATENT DOCUMENTS

| | | | |
|---|---|---|---|
| 2,263,237 | 11/1941 | Fiscus | 242/84.5 |
| 2,483,696 | 10/1949 | Giera | 242/99 |
| 2,574,216 | 11/1951 | Lindgren | 242/106 |
| 2,648,506 | 8/1953 | Kirby | 242/218 |
| 2,672,303 | 3/1954 | Smith | 242/97 |
| 2,706,096 | 4/1955 | Rufle | 242/97 |
| 2,753,131 | 7/1956 | Erdman | 242/96 |
| 2,855,717 | 10/1958 | Heil | 242/96 |
| 3,112,225 | 11/1963 | Harms | 242/96 |
| 3,731,887 | 5/1973 | Wheeler | 242/96 |
| 4,596,365 | 6/1986 | Wang | 242/96 |

Primary Examiner—Billy S. Taylor
Attorney, Agent, or Firm—Oltman and Flynn

[57] ABSTRACT

A hand-held fishing reel having a line spool rotatably mounted on a frame and a handle extending from the frame outward from the spool's rotational axis to enable the user to hold the handle in one hand above the frame and behind the spool's rotational axis. A transverse extension on the outer end of the handle supports a line guide in front of the handle and outward from the periphery of the spool. The line guide is far enough in front of the handle to avoid interference between the hand holding the handle and the line but close enough that the user can extend the index finger of that hand in front of the handle and engage the line for sensing a strike on the line.

4 Claims, 6 Drawing Figures

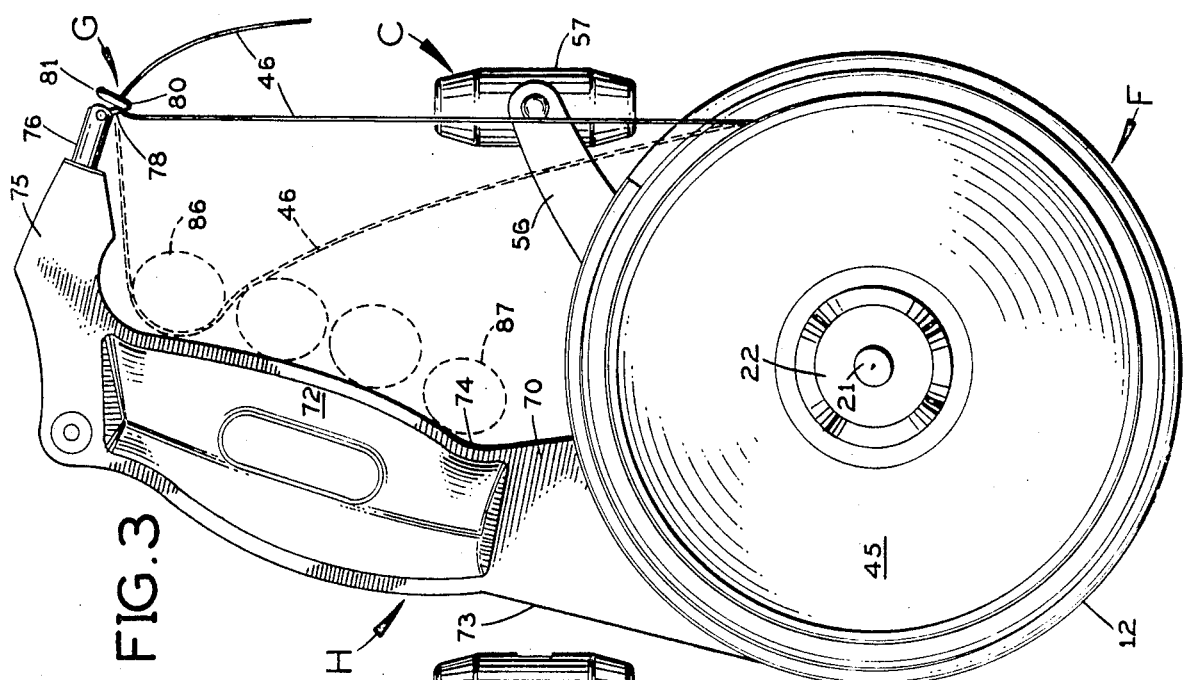
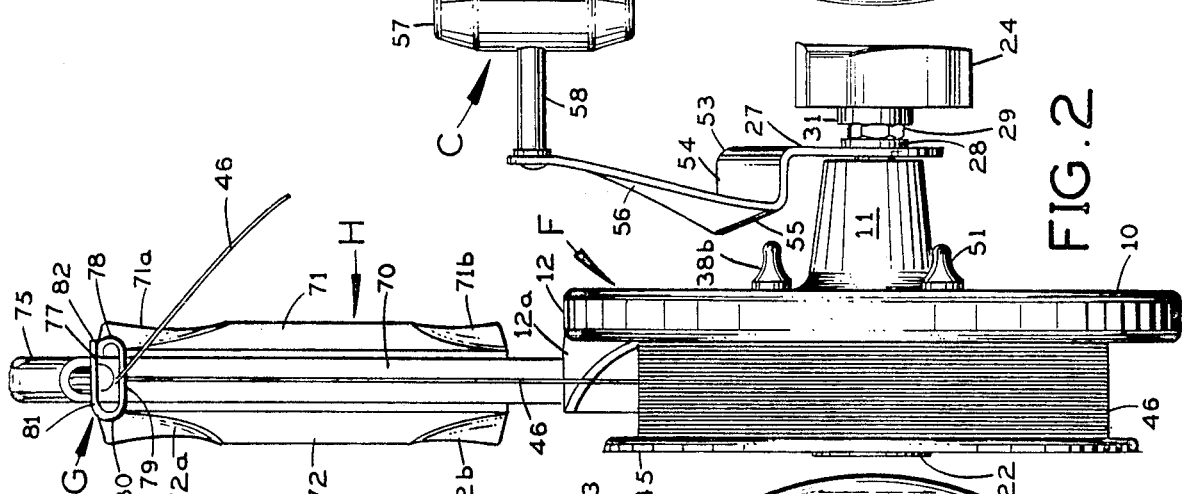
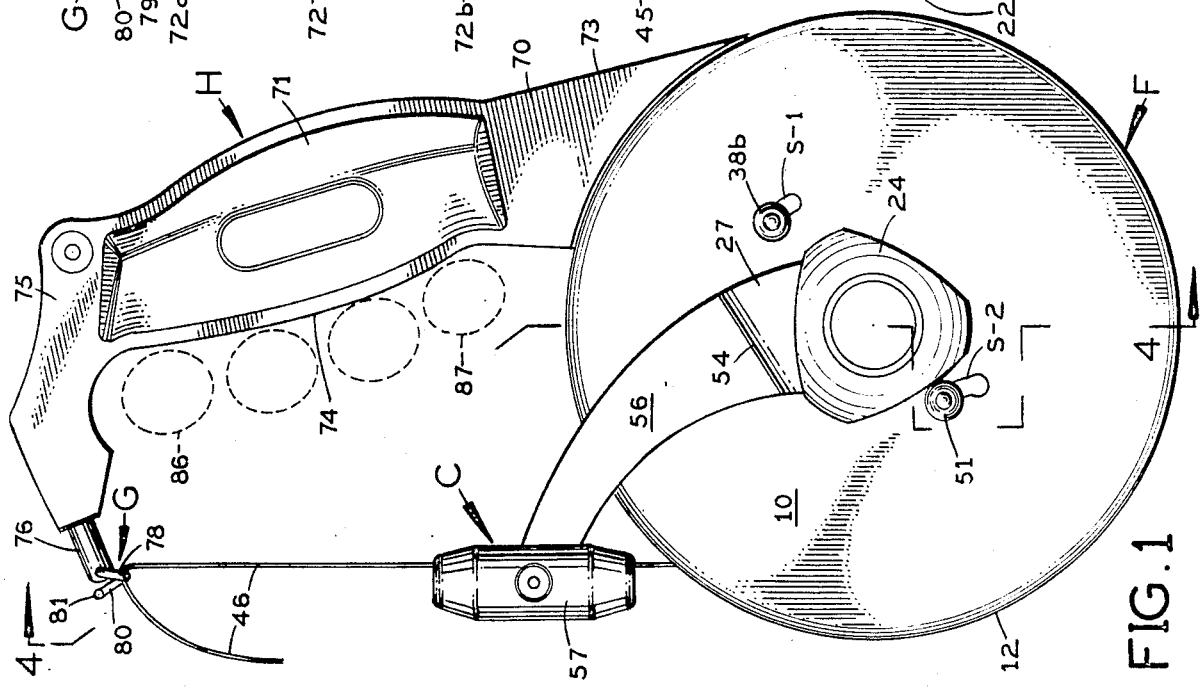

HAND-HELD FISHING REEL

CROSS-REFERENCE TO RELATED APPLICATION

This is a continuation-in-part of my U.S. patent application Ser. No. 06/673,582, filed Nov. 21, 1984 and now abandoned.

SUMMARY OF THE INVENTION

This invention relates to a hand-held fishing reel having a novel arrangement of a handle and a line guide which facilitates the use of the reel.

The present reel has the usual line spool rotatably mounted on a rigid frame and a manual crank for rotating the spool. In accordance with the present invention, a handle extends from the frame laterally outward from the axis of rotation of the spool and beyond the periphery of the spool in a nonradial direction, so that when held by one hand of the user the handle extends up from the frame behind the spool axis. A transverse extension extends from the outer end of the handle in front of the handle and generally parallel to the closest part of the periphery of the spool. Away from the handle this transverse extension carries a line guide positioned in front of the spool axis and slidably passing the line wound on the spool. The distance of the line guide in front of the handle is such that the user's hand does not interfere with the movement of the line when all of the user's fingers are gripping the handle, but the user can engage the line with his index finger by extending it in front of the handle and then pulling the line back toward the handle while keeping the other fingers of that hand gripping the handle. This enables the user's index finger to sense immediately a pull on the line between the line guide and the spool when a fish strikes. Preferably, the present reel has a one-way ratchet and pawl arrangement acting between the frame and a rotatable sleeve frictionally coupled to the spool. This ratchet and pawl can be used to prevent the unwinding of the line from the spool. The reel has a friction coupling device acting between the sleeve and the spool to permit the spool to rotate in a line-unwinding direction when a fish strikes, thereby reducing shock which might cause line breakage. Also, the present reel preferably has a device for producing an audible sound when the line is being unwound from the spool.

A principal object of this invention is to provide a hand-held fishing reel with a novel handle and line guide arrangement enabling the user, when he wishes, to engage the line with a finger of the hand which is holding the handle.

Further objects and advantages of this invention will be apparent from the following detailed description of a presently preferred embodiment which is illustrated schematically in the accompanying drawings.

DESCRIPTION OF THE DRAWINGS

FIG. 1 is a side elevational view of a fishing reel according to the present invention;

FIG. 2 is an end elevation taken from the left of FIG. 1;

FIG. 3 is a side elevation showing the opposite side from the one shown in FIG. 1;

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Referring to FIGS. 1-3, in broad outline the present invention comprises a rigid support frame F, a fishing line spool S rotatably mounted on the frame, a manual crank C rotatably mounted on the frame and coupled to the spool through a clutch, a rigid handle H extending from the support frame F, and a line guide G carried by the handle and slidably passing the line wound on the spool S.

Figure 4:
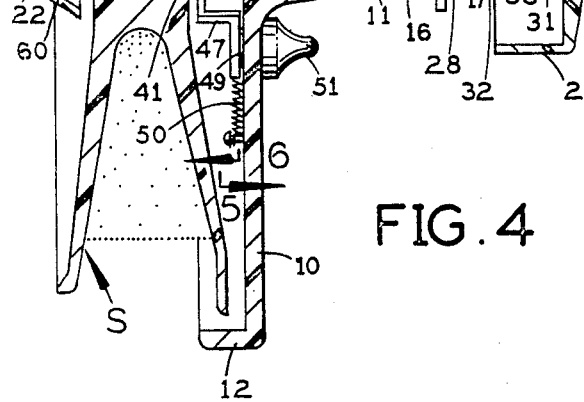
FIG. 4 is a view taken along the section line 4—4 in FIG. 1.

Referring to FIG. 4, the rigid support frame F comprises a one-piece molded plastic body having a flat, circular front wall 10 joined integrally on one side to a central, annular hub 11 and on the opposite side to a peripheral circular lip 12. For part of its extent the peripheral lip 12 is widened (at 12a in FIG. 4) for the attachment of the handle H by screws 13. The front wall 10 and the hub 11 of the frame are formed with a cylindrical axial opening 14.

A generally cylindrical sleeve 15 is rotatably received in the frame opening 14. At its right end in FIG. 4, the sleeve 15 extends beyond the frame hub 11 and presents a non-circular segment 16 with flat opposite faces and, beyond that, an externally screw-threaded segment 17. At its left end in FIG. 4 the sleeve 15 is formed with a cross-slot 18 of narrow circumferential extent.

Figure 5:
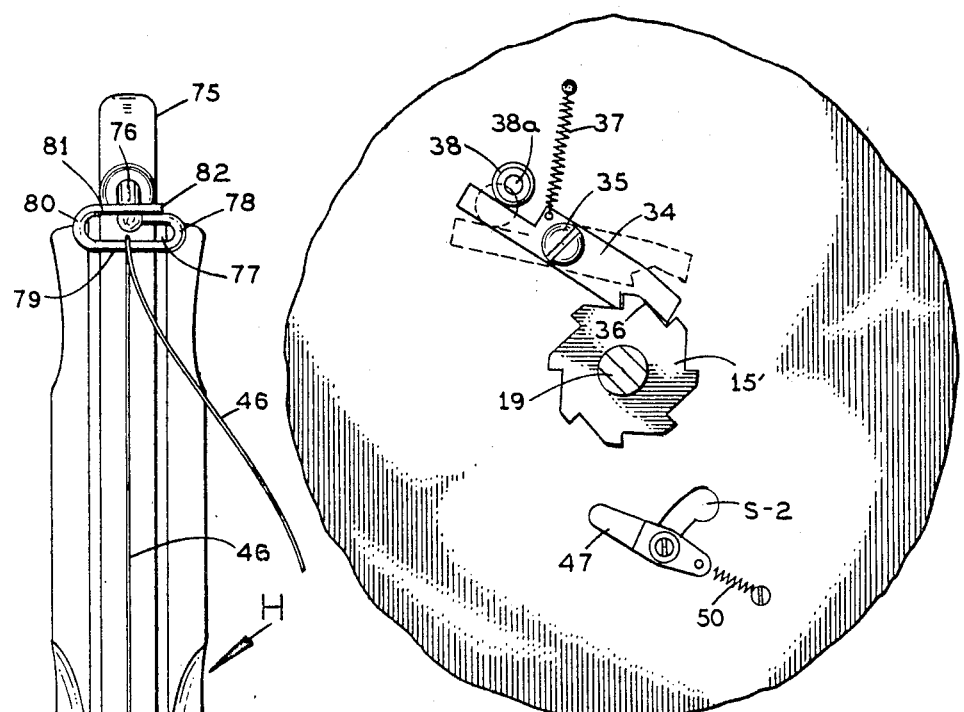
FIG. 5 is a fragmentary section taken along the line 5—5 in FIG. 4.

Just beyond the inner face of the frame wall 10 (the left face in FIG. 4), the sleeve 15 presents an integral ratchet 15' with a series of ratchet teeth in succession circumferentially, as shown in FIG. 5.

A shaft 19 is rotatably received in the sleeve 15. Toward its left end in FIG. 4 the shaft carries a cross-pin 20 which is snugly and slidably received in the cross-slot 18 in sleeve 15 to releasably couple the shaft 19 to sleeve 15 for rotation in unison. Beyond the cross pin 20 (to the left in FIG. 4), the shaft 19 terminates in an annular, transversely enlarged head 21 of circular outline. A flanged annular end cap 22 is slidably received on shaft 19 immediately to the left of the end head 21 of the shaft in FIG. 4. At its right end in this Figure, the shaft 19 extends beyond sleeve 15 and terminates in a screw-threaded end segment 23. A knob 24 is splined to a flanged hub piece 25, which has a screw-threaded recess 26 on its inner end threadedly receiving the threaded end segment 23 of shaft 19.

The crank C on its inner end has a flat mounting segment 27 with an opening complementary to, and snugly but slidably receiving, the non-circular segment 16 of sleeve 15. A flat annular metal washer 28 is engaged between the outer face of crank segment 27 and a pair of clamping nuts 29 and 30 threaded onto sleeve segment 17.

The knob 24 has an annular central hub 31 formed with a counterbore 32 at its inner end which loosely receives the outer clamping nut 30. A flat annular washer 33 of anti-friction material is engaged between the outer clamping nut 30 and the inner end of counterbore 32 in knob 24.

As shown in FIGS. 4 and 5, a pawl 34 is pivotally supported by a bolt 35 at the inner face of the frame wall 10. As shown in FIG. 5, on one side of its pivot the pawl 34 presents a recess 36 which is shaped complementary to one of the ratchet teeth on ratchet 15, which is integral with sleeve 15. When pawl 34 is in its full line position in FIG. 1 the sleeve 15 and ratchet 15' can be turned clockwise in FIG. 5 (for winding the line on the spool) but not counterclockwise due to the shape and position of the recess 36 in the pawl 34. A tension spring 37 pulls up on the pawl 34 on the opposite side of its pivot 35 from the side where the recess 36 is located, so this spring biases the pawl to position its recess 36 down against the ratchet 15. When the ratchet 15' is rotated clockwise in FIG. 5, the spring 37 yields to permit the pawl to pivot counterclockwise on its pivot 35 so that the ratchet tooth can move past it.

The pawl 34 can be released from the ratchet 15' (so that the ratchet 15' and sleeve 15 can be turned in either direction) by a pin assembly 38 slidably mounted in an arcuate slot S-1 (FIG. 1) in the frame wall 10. FIG. 5 shows the pin assembly 38 in full lines at one end of this slot, in the position in which it does not engage the pawl 34 and has no effect on it. In the phantom line position in FIG. 5, the pin assembly 38 is at the opposite end of the slot S-1 and here it engages the pawl 34 on the opposite side of its pivot from its ratchet-engaging recess 36, holding the pawl in a retracted position in which it does not engage the ratchet 15'.

The pin assembly 38 (FIG. 4) includes a central pin 38a extending slidably through the slot S-1 in the frame wall 10 and presenting a screw-threaded segment on the opposite (outer) side of the frame wall 10. A clamping head 38b (FIGS. 1 and 2) is threaded onto this end of pin 38a for adjustment between a clamping position in which it is tight against the outer face of frame wall 10 and a released position in which the pin 38a can be adjusted along the slot S-1.

Figure 6:
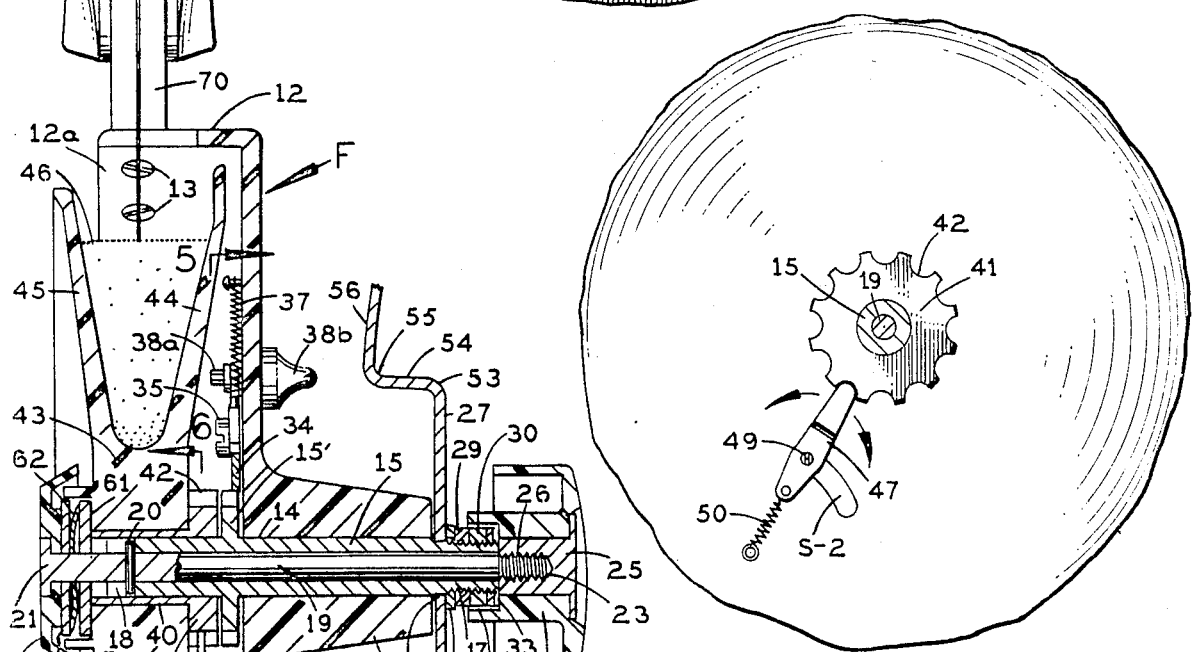
FIG. 6 is a fragmentary section taken along the line 6—6 in FIG. 4.

The spool S has a cylindrical central sleeve 40 rotatably mounted on the sleeve 15 and joined integrally to an enlarged transverse flange 41 having a series of rounded notches 42 in succession circumferentially, as best seen in FIG. 6. As shown in FIG. 4, the notched flange 41 on the spool sleeve is spaced closely axially inward from the ratchet 15' on sleeve 15.

The spool S also has a relatively thick central hub 43 joined adhesively or otherwise to the sleeve 40 and encircling the latter. Opposite annular end segments 44 and 45 extend out from the hub 43 at opposite angles so that the spool presents an annular pocket or recess which is progressively wider radially outward from the hub 43. A fishing line 46 of nylon or other suitable flexible material is wound up in this pocket or recess in the spool.

A finger 47 is mounted on the inner side of the frame wall 10 for adjustment between an operative position (FIG. 6) in which it engages the notched periphery of the spool flange 41 and a retracted, released position in which it does not engage the spool flange. As shown in FIG. 6, the frame wall 10 has an arcuate slot S-2 which slidably receives a pin 49 on which the finger 47 is pivoted. When pin 49 is at the left end of slot S-2 in FIG. 6, the finger 47 is in its operative position. When pin 49 is at the right end of slot 48 in FIG. 6, the finger 47 is in its released position. A tension spring 50 pulls on the finger 47 so that normally the finger is aligned with the axis of the spring. However, finger 47 pivots easily on pin 49 to permit the spool flange 42 to rotate past it, making an audible clicking sound as the notched periphery of the flange strikes the finger.

Pin 49 extends through the frame wall 10 and is screw-threaded at the outer side of this wall. A clamping head 51 (FIGS. 1, 2 and 4) is threadedly mounted on this end of the pin for adjustment between a clamping position in which it is tight against the outer face of frame wall 10 and a released position in which it permits pin 49 to be adjusted along slot S-2.

As shown in FIGS. 4 and 2, the mounting segment 27 of the crank C is a relatively thin, rigid part that extends radially outward from the axis of the spool and is joined at a right-angled bend 53 to a short, flat, rigid segment 54, which extends in perpendicularly toward the front wall 10 of the frame. The inner end of segment 54 is joined at a bend 55 to a curved longer arm 56, which extends out from the axis of the reel at a small angle away from the front wall 10 of the frame. The crank has a handle 57 rigidly connected to one end of a shaft 58 whose opposite end is rotatably mounted on the outer end of the crank arm 56. Shaft 58 extends parallel to the rotational axis of the line spool. Handle 57 extends perpendicularly on opposite sides of shaft 58.

The crank C may be revolved about the axis of shaft 19 counterclockwise in FIG. 1 whether the pawl 34 is in engagement with the ratchet 15', as shown in full lines in FIG. 5, or is disengaged from it, as shown in phantom in FIG. 5. Revolving the crank in this direction causes sleeve 15 to rotate about the axis of shaft 19 in the same direction.

When the cross-pin 20 on shaft 19 is received in the cross-slots 18 in sleeve 15, the rotation of sleeve 15 by the crank C will be imparted to shaft 19. A friction coupling device acts between the left end of shaft 19 in FIG. 4 and the line spool S to normally impart the rotation of shaft 19 to the spool. This friction device comprises a flat, rigid, annular washer 60 at the inner side of cap 22, a similar washer 61 engaging the outer side of spool S, and a wavy annular spring washer 62 engaged under compression between flat between washers 60 and 61. When the knob 24 is tightened on the opposite end of shaft 19, it draws the end cap 22 tightly against washer 60 which flattens the wavy spring washer 62 against washer 61 to provide a frictional coupling between shaft 19 and the line spool S.

The handle H has a generally flat central piece 70 which is attached by the previously mentioned screws 13 (FIG. 4) to the widened part 12a of the peripheral wall of the frame. Hand grip pieces 71 and 72 are adhesively bonded to the opposite faces of the central piece 70. As shown in FIG. 2, the hand grip pieces 71 and 72 are formed with rounded depressions 71a and 72a near their respective ends away from the reel and similar depressions 71b and 72b are their ends closest to the reel. The depressions 71a and 72a receive the index finger 86 of the user holding the handle and the depressions 71b and 72b receive the user's little finger. The handle is long enough outward from the frame to be held by all the fingers of a person's hand.

The outer edge 73 of the central piece 70 of the handle extends generally tangent to the circular periphery of the frame F of the fishing reel, as shown in FIGS. 1 and 3. The inner edge 74 of the central piece of the handle extends generally parallel to its outer edge 73. As a whole, the handle lies generally in a plane extending perpendicular to the axis of rotation of the spool. At its outer end away from the reel frame F the central piece of the handle has a transverse segment 75 which extends generally parallel to the closest part of the periphery of the reel frame and almost perpendicular to the general direction of the handle outward from the reel frame.

The line guide G has a rigid stem 76 anchored in the free end of the transverse handle segment 75 and extending longitudinally from it. The guide element of the line guide is a bent, rigid, relatively thick wire piece including a short attachment segment 77 which, as shown in FIG. 2, extends perpendicularly from one side of the stem 76 to a generally U-shaped connecting segment 78 which makes a 180 degree turn downward, and a straight bottom segment 79 extending horizontally below and in front of the stem 76 from connecting segment 78 to a similar U-shaped connecting segment 80 on the opposite side of the stem. The connecting segment 80 curves up and laterally inward toward stem 76 to a straight upper segment 81 which crosses in front of the free end of stem 76 at a slight angle upward. Segment 81 terminates in a free end 82 which is spaced in front of the attachment segment 77 and the rounded connecting segment 78 and is on the same side of stem 76 as segments 77 and 78. Segment 81 throughout its entire extent is spaced in front of the end of stem 76 a distance more than the strand thickness of the line 46 on the reel so as to provide an opening on one side for the insertion or removal of the line. When a person holds the handle H extending up from the frame, the handle is behind the rotational axis of the spool S and the line guide G is in front of that axis.

The line 46 passes up from the spool S behind the bottom segment 79 of the line guide and then across the top of that segment of the line guide.

In the use of this apparatus, as shown in FIG. 1, the user can grasp the handle H with his little finger 87 toward the reel frame F and his index finger 86 away from it, with his fingers extending across the inner edge 74 of the handle and with the outer edge 73 of the handle seated against the palm of his hand. The user's thumb and the free ends of his fingers extend across the same side of the handle as where the crank C is located. FIG. 1 shows in phantom the four fingers of a user's right hand grasping the handle, with the index finger 86 and the top and the little finger 87 at the bottom. The line guide G is offset far enough in front of the user's fingers and thumb that the line 46 passes between the reel and the line guide without interference with that hand when all of the user's fingers grasp the handle, as shown in FIG. 1.

The user, while still holding the handle, can extend his index finger in front of the line 46 and pull it back to the position shown in phantom in FIG. 3. A strike on the line will be felt immediately by the index finger of the hand grasping the handle.

If a strike on the line occurs while the pawl 34 locks the ratchet 15' against rotation, as shown in full lines in FIG. 5, the friction device 60-62 will act as a friction brake, permitting the spool S to rotate because of the pull on the line even though the sleeve 15 cannot rotate in the line unwinding direction. The device 60-62 exerts a frictional drag on the line which retards but does not completely prevent its unwinding. This prevents shock to the line which might cause it to break.

I claim:

1. In a hand-held fishing reel having:
    a rigid support frame;
    a fishing line spool rotatably mounted on said frame;
    a manual crank rotatably mounted on said frame;
    and coupling means operatively coupling said crank to said spool to impart the rotation of said crank to said spool;
    the improvement which comprises:
    a rigid handle connected to said support frame and presenting opposite first and second longitudinal edges each extending outward beyond the periphery of the spool in a direction away from a rotational axis of the spool, said handle presenting an outer end away from said support frame, the edge of said handle lying generally in a plane perpendicular to the rotational axis of the spool, said first longitudinal edge of the handle being long enough outward beyond said support frame and said spool to receive all the fingers of a person's hand, and said second longitudinal edge being engageable by the palm of the person's hand grasping the handle with the fingers engaging said first longitudinal edge;
    a transverse extension on the outer end of said handle away from the spool, said extension extending past said first longitudinal edge in a direction away from said second longitudinal edge of said handle generally transverse to the rotational axis of the spool;
    and a line guide connected to said transverse extension away from the handle and presenting a guide element positioned beyond said first longitudinal edge of the handle in said direction away from said second longitudinal edge, said guide element being shaped to slidably pass a fishing line wound on said spool, said guide element being positioned far enough beyond said first longitudinal edge of said handle in said direction away from said second longitudinal edge to avoid interference of the fishing line with the fingers of a user's hand grasping the handle but close enough to said first longitudinal edge of the handle to enable the user to extend the index finger of said hand to engage the line while the rest of said hand continues to grasp the handle.

2. A fishing reel according to claim 1 wherein said guide element is open on one side for the insertion or removal of said line at said open side of the guide element.

3. In a hand-held fishing reel having:
    a rigid support frame;
    a fishing line spool rotatably mounted on said frame;
    and a manual crank operatively coupled to said spool for rotating the latter;
    the improvement which comprises:
    a handle rigidly connected to said frame and presenting opposite first and second longitudinal edges each extending outward from a rotational axis of the spool, the edges of said handle lying generally in a plane perpendicular to said axis, said handle being long enough to be grasped by one hand of the user above said frame with all the fingers of the hand extending across said first longitudinal edge while the palm of the hand engages said second longitudinal edge of the handle;
    a line guide element for slidably passing a fishing line wound on the spool;

and means supporting said line guide element from said handle spaced outward from the spool and extending past said first longitudinal edge of the handle in a direction away from said second longitudinal edge and generally transverse to the rotational axis of the spool in a position to pass the line without interference with the user's hand grasping the handle with the fingers extending across said first longitudinal edge and the palm of the hand engaging said second longitudinal edge but close enough to the handle to enable the user to engage the line by extending the index finger of said hand from said first longitudinal edge of the handle.

4. A fishing reel according to claim 3 wherein
said handle is connected to said frame on one side of the rotational axis of the spool;
and said line guide is positioned on the opposite side of the rotational axis of the spool from the connection of said handle to the frame.

* * * * *